US006314818B1

(12) United States Patent
Mandon

(10) Patent No.: US 6,314,818 B1
(45) Date of Patent: Nov. 13, 2001

(54) APPARATUS AND METHOD OF MEASURING THE STRESS ON A WORK MACHINE

(75) Inventor: Stephane L. Mandon, La Murette (FR)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/280,162

(22) Filed: Mar. 29, 1999

(51) Int. Cl.$^7$ .................. G01B 7/16; G01L 1/00
(52) U.S. Cl. .................................................. 73/781
(58) Field of Search .................. 73/781, 862.49, 73/862.54, 862.64; 701/862.52; 91/361; 60/327

(56) References Cited

U.S. PATENT DOCUMENTS

| | | | |
|---|---|---|---|
| 3,853,001 | 12/1974 | Mock | 73/133 R |
| 4,042,049 | 8/1977 | Reichow et al. | 177/137 |
| 4,102,031 | 7/1978 | Reichow et al. | 29/464 |
| 4,420,985 | 12/1983 | Raskin | 73/862.66 |
| 4,523,475 * | 6/1985 | Bills, Jr. et al. | 73/781 |
| 4,549,425 | 10/1985 | Wisebaker et al. | 72/422 |
| 4,839,835 | 6/1989 | Hagenbuch | 364/567 |
| 4,930,228 | 6/1990 | Anderson et al. | 33/788 |
| 5,410,109 | 4/1995 | Tarter et al. | 177/36 |
| 6,032,093 * | 2/2000 | Debraber et al. | 701/50 |
| 6,099,236 * | 8/2000 | Wiechman | 414/708 |

* cited by examiner

*Primary Examiner*—Benjamin R. Fuller
*Assistant Examiner*—Octavia Davis
(74) *Attorney, Agent, or Firm*—Byron G. Buck; Liza J. Meyers

(57) ABSTRACT

An apparatus and method of measuring the stress on a work machine is disclosed. A work machine includes a frame, a plurality of ground engaging devices, an operator compartment, an implement having a linkage, an engine, and a stress measurement control system. The stress measurement control system includes a strain gauge sensor, a memory, an electronic controller, and an operator interface. The strain gauge sensor assembly is mounted to the frame or the implement and provides a stress signal indicative of the stress acting upon the frame or the implement. The memory stores a stress signal value and stress limit value. The electronic controller receives the stress signal and the stress limit value, determines whether the stress signal is greater than the stress limit value, and responsively stores the stress signal value in the memory and provides an associated message. The operator interface receives the associated message and provides it to the operator in the operator compartment.

12 Claims, 3 Drawing Sheets

Fig_1_
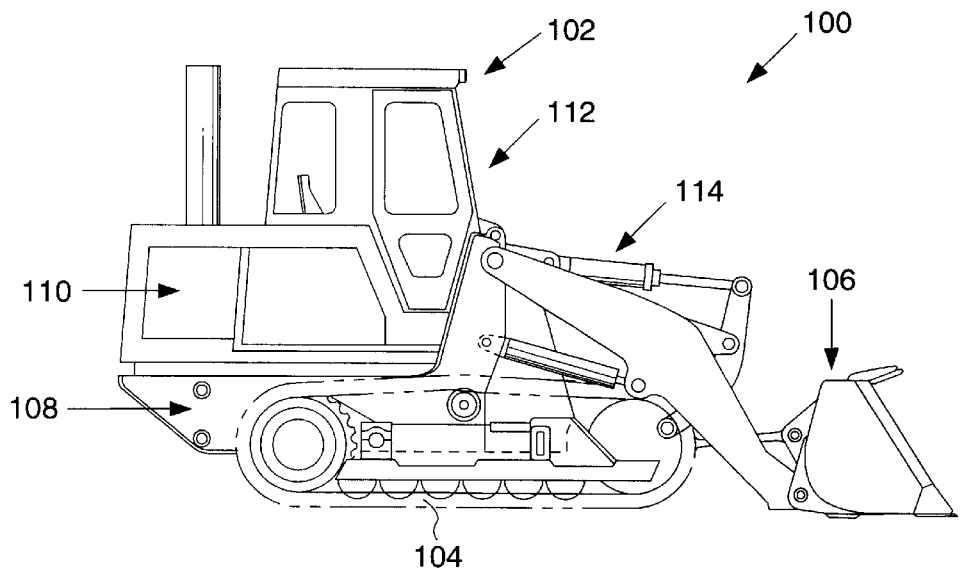
Fig_2_
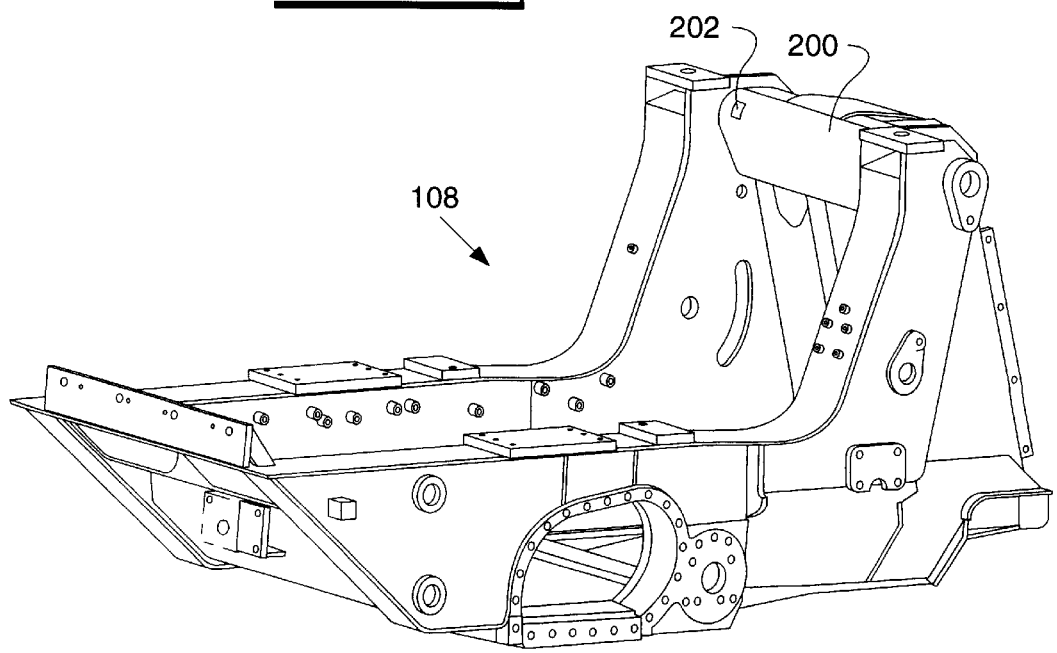

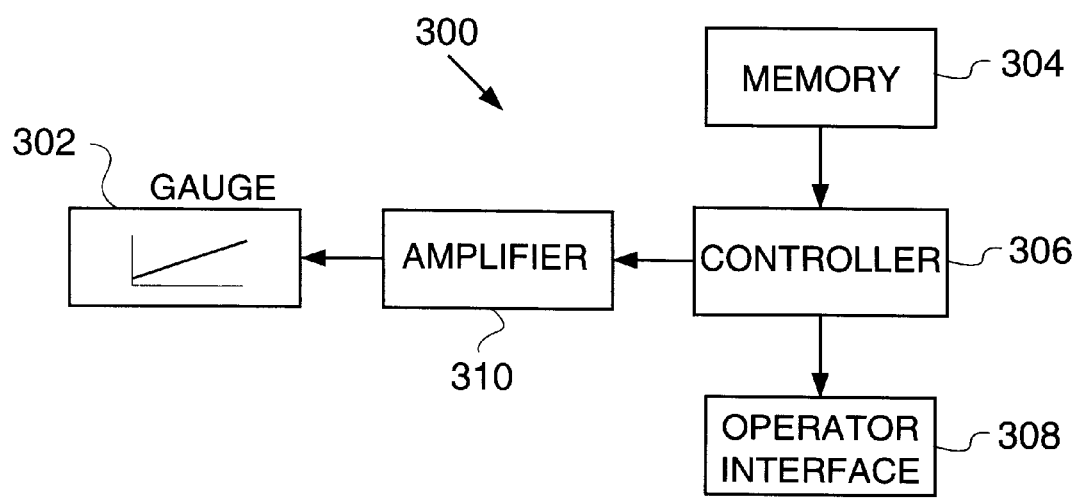
Fig_3_

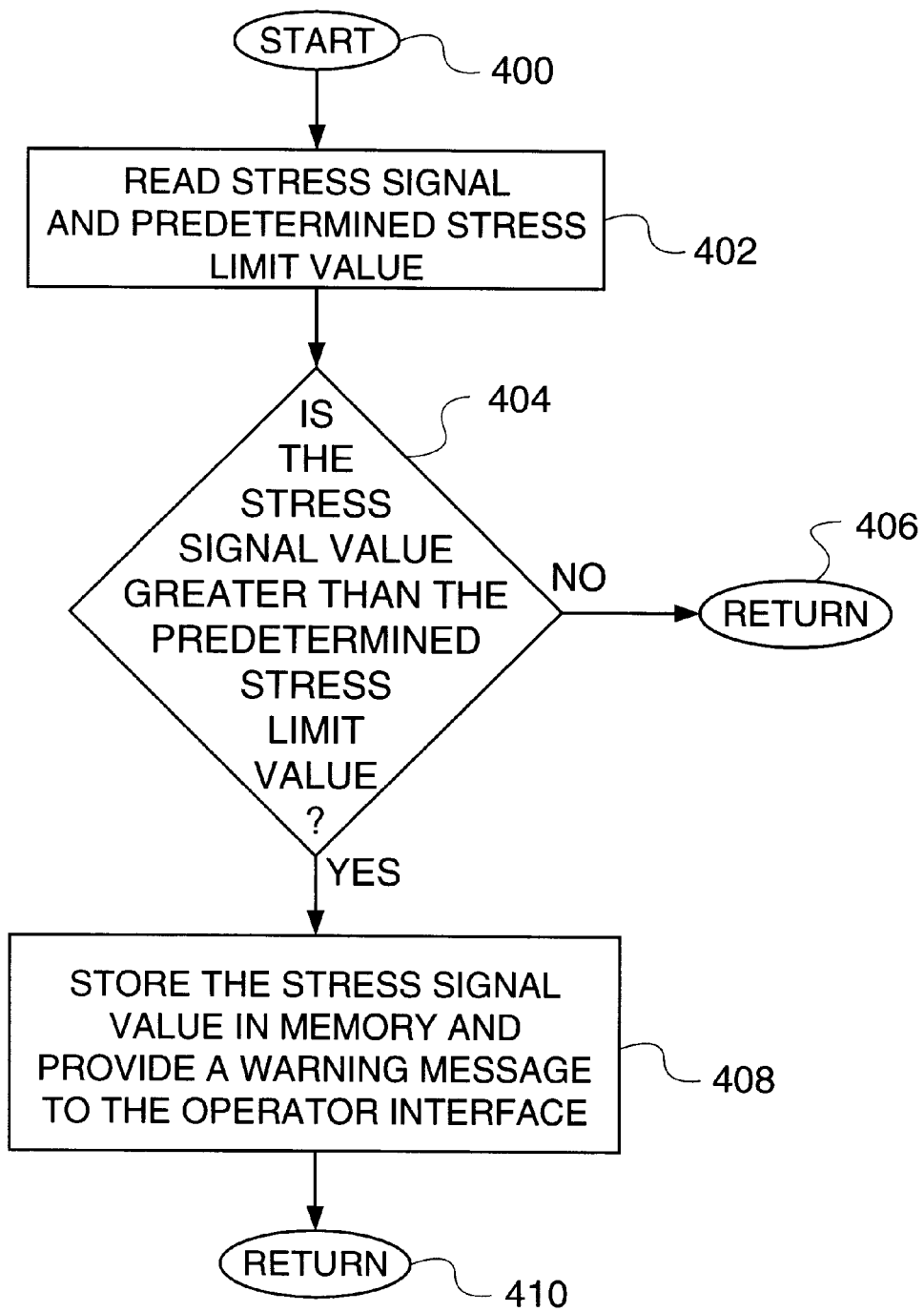

APPARATUS AND METHOD OF MEASURING THE STRESS ON A WORK MACHINE

TECHNICAL FIELD

This invention relates generally to an apparatus and method of measuring the stress on a work machine and, more particularly, to an apparatus and method that determines whether the stress is greater than a pre-determined stress limit value and responsively stores a value of the stress in memory and provides an associated message to the operator.

BACKGROUND ART

Work machines having an attached implement, such as motor graders, excavators, mining shovels, backhoe loaders, wheel loaders, track type tractors, wheeled tractors, compactors, track type loaders, and the like, are used for moving earth. Such implements may include buckets, blades, impact rock rippers, and other material handling apparatus. Typically, work machines may be configured to perform various work cycles. For example, a track type loader typically has a bucket used to dig, collect (rack) a load, carry a load, and/or dump a load.

In general, a work machine has a frame and an implement having a linkage operably connecting the implement to the frame. Typically, as the work machine performs various work cycles, various portions of the frame, implement, and linkage can be subject to structural or mechanical stress. Such work cycles may include digging, loading, racking, lifting, carrying, dumping, and lowering a load. Often the stress repeatedly occurs on particular structures or portions of the machine. The stress can cause fatigue or damage to the structures. Structural portions most susceptible to stress are cross members, and more particularly, portions of the cross members proximate to the weldjoint.

Tension strain gauges and compression strain gauges secured to beams and connected in a Wheatstone bridge circuit to deliver an output signal related to the magnitude of force supported by the beams is known from U.S. Pat. No. 4,420,985.

Further, it is known from U.S. Pat. No. 3,853,001 to use strain gauges mounted within the hinge pin of a crane for measuring the force tending to overturn a crane and immediately indicate the measurement to the operator on a single gauge irrespective of the angle of the boom.

Accordingly, the art has sought an apparatus and method of measuring the stress on a work machine which: records the highest stress corresponding to abnormal usage; signals all the overloads directly to the operator; helps the operator reduce the wear and damage to structural members; and is more economical to manufacture and use.

The present invention is directed to overcoming one or more of the problems as set forth above.

DISCLOSURE OF THE INVENTION

In one aspect of the present invention, a work machine adapted to be controlled by an operator and for acting upon a load through a plurality of work cycles is provided. The work machine includes a frame, a plurality of ground engaging devices supporting the frame, an operator compartment supported by the ground engaging devices, an implement having a linkage for operably connecting the implement to the frame, an engine operably coupled to the ground engaging devices, and a stress measurement control system. The stress measurement control system includes a strain gauge sensor assembly, a memory, an electronic controller, and an operator interface. The strain gauge sensor assembly is mounted to the frame or the implement and is adapted to provide a stress signal having a value indicative of the stress acting upon the frame or the implement. The memory is adapted to store a stress signal value and a pre-determined stress limit value. The electronic controller is associated with the memory and is adapted to receive the stress signal and the pre-determined stress limit value. Further, the electronic controller determines whether the stress signal value is greater than the pre-determined stress limit value and responsibly stores the stress signal value in the memory and provides an associated message. The operator interface is adapted to receive the associated message and provides the message to the operator in the operator compartment.

In another aspect of the present invention, a method for measuring the stress on a work machine adapted to be controlled by an operator and for acting upon a load through a plurality of work cycles is provided. A strain gauge sensor assembly is mounted to the frame or the implement and a stress signal having a value indicative of the stress acting upon the frame or the implement is provided. The stress signal value and a pre-determined stress limit value is stored. The stress signal and the pre-determined stress limit value are received and it is determined whether the stress signal value is greater than the stress limit value. In response, the stress signal value is stored and an associated message is provided to the operator in the operator compartment.

These and other aspects and advantages of the present invention will become apparent to those skilled in the art upon reading the detailed description of the best mode for carrying out the invention in connection with the drawings and appended claims.

BRIEF DESCRIPTION OF THE DRAWINGS

For a better understanding of the invention, reference may be made to the accompanying drawings in which:

FIG. 1 is a side view of a track type loader according to one embodiment of the present invention;

FIG. 2 shows an isometric view of a frame of a track type loader according to one embodiment of the present invention;

FIG. 3 is a schematic of a stress measurement control system according to one embodiment of the present invention; and FIG. 4 is a flow chart of software logic implement in a preferred embodiment of the present invention.

BEST MODE FOR CARRYING OUT THE INVENTION

A preferred embodiment of the present invention provides an apparatus and method of measuring the stress on a work machine 100 adapted to be controlled by an operator and for acting upon a load through a plurality of work cycles. The following description uses a track type loader 102 having ground engaging devices, tracks 104, and a work implement 106 as an example only. This invention can be applied to other types of work machines 100 having wheels (not shown) instead of tracks 104 and other types of implements 106 well known in the art. Other examples include mining shovels, wheel loaders, backhoe loaders, motor graders, track type tractors, compactors, wheeled tractors, and the like.

In FIG. 1, a frame 108 is supported by a plurality of ground engaging devices 104. A work implement 106, which preferably includes a bucket in the example of a track type loader, has a linkage 114 for operably connecting the implement 106 to the frame 108. In a preferred embodiment, the frame 108 includes a cross member 200 that is subject to stress that changes depending on the work cycle and load acted upon by the implement 106. Advantageously, the cross member 200 is connected to the frame by a weldjoint 202. Further, an engine 110 is operably coupled to the ground engaging devices 104. Additionally, an operator compartment 112 is supported by the ground engaging devices 104.

Referring now to FIG. 3, a work machine 100 includes a stress measurement control system 300. The stress measurement control system 300 includes a strain gauge sensor assembly 302, a memory 304, a controller 306, and an operator interface 308. The strain gauge sensor assembly 302 is mounted to the frame 108 or the implement 106 and provides a stress signal having a stress signal value indicative of the stress acting upon the frame 108 or the implement 106. In a preferred embodiment, the strain gauge sensor assembly 302 is tack welded to the cross member 200 proximate the weldjoint 202. Advantageously, the strain gauge sensor assembly 302 is tack welded to the cross member 200 one-half of an inch away from weldjoint 202. The strain gauge sensor assembly 302 could be bonded to the cross member 200 or other high stress point using any of several adhesives readily available and known in the art. It is advantageous to include in the strain gauge sensor assembly 302 a device to protect it from the elements, debris, and other hazards. In a preferred embodiment, the strain gauge sensor assembly 302 provides a signal to amplifier 310 which in turn provides an optimized stress signal. Amplifier 310 is preferably mounted within the operator compartment 112. It should be appreciated that amplifier 310 could be any of several known amplifiers but is preferably a Wheatstone Bridge amplifier. The particular selection of an amplifier depends on the specifications and specific design.

Memory 304 stores at least one stress signal value and one pre-determined stress limit value. In the preferred embodiment, the stress limit value is a pre-determined value that represents the least amount of stress acting upon the frame 108 or implement 106 that is recorded and for which the operator is notified.

The controller 306 is associated with the memory 304 and receives the stress signal and the pre-determined stress limit value. The controller 306 determines whether the stress signal value is greater than the pre-determined stress limit value and responsibly stores the stress signal value in memory 304 and provides an associated message. The electronic controller 306 may include one or more control modules to control the operation of the stress measurement control system 300. Preferably, the electronic controller 306 includes a microprocessor. It is noted that the term "microprocessor" is meant to at least include microcomputers, microprocessors, integrated circuits, and the like capable of being programmed. The electronic controller 306 preferably contains sufficient electronic circuitry to convert input signals from a plurality of sensors, make several computations based on the input signals, and generate output signals with sufficient power to drive the plurality of devices. Preferably, the microprocessor is programmed with the plurality of pre-selected logic rules for producing one or more output signals in response to receiving one or more input signals.

The operator interface 308 receives the associated message and provides the message to the operator in the operator compartment 112. The associated message may be provided to the operator as a audible message, or preferably, as a visual message. The operator interface 308 may be a liquid crystal display, console, keyboard, push buttons, voice recognition devices, a lap top computer, speakers, or other interfaces well known in the art or, preferably a warning light. It is advantageous for the visual message to be a warning light mounted in the operator compartment 112.

Referring now to FIG. 4, a flow chart of the software logic used in connection with the preferred embodiment is shown. Those skilled in the art could readily and easily write software implementing the flow chart shown in FIG. 4 using the instruction set, or other appropriate language associated with the particular microprocessor to be used. In the preferred embodiment, a Motorola 68HC11 is used in the electronic controller 306. However, other known microprocessors could readily and easily be used without deviating from the scope of the present invention as defined in the appended claims.

First block 400 begins the program control. Program control passes from first block 400 to second block 402. In second block 402, the electronic controller 306 reads the stress signal and pre-determined stress limit value. It should be appreciated that the specific value for the pre-determined stress limit value may be a constant or may vary. However, the stress limit value is advantageously determined based upon empirical or test data for a particular work machine 100 depending upon the implement 106 or frame 108 being monitored and the work cycle being performed. From second block 402, program control passes to first decision block 404. This information may be provided in the form of a mathematical equation or a look-up table containing appropriate values.

In first decision block 404, the electronic controller 306 determines whether the stress signal value is greater than the pre-determined stress limit value. If the stress signal value is not greater than the pre-determined stress limit value, program control passes to third block 406. Otherwise, program control passes from first decision block 404 to fourth block 408.

In fourth block 408, the electronic controller 306 stores the stress signal value in memory 304 and provides a warning message to the operator interface 308. From fourth block 408, program control passes to fifth block 410.

In fifth block 410 and third block 406, program control returns to the main program. The logic of FIG. 4 is preferably performed every control loop to help ensure accurate stress measurement and provide instantaneous warning to the operator of the work machine 100. However, those skilled in the art know that the aspects of the stress measurement control system 300 could be determined at other frequencies depending on factors like the type of load and work cycle being performed without deviating from the invention as defined by the appended claims.

While aspects of the present invention have been particularly shown and described with reference to the preferred embodiment above, it will be understood by those skilled in the art that various additional embodiments may be contemplated without departing from the spirit and scope of the present invention. For example, instead of storing the stress signal value in memory 304, the stress signal value may be transmitted via a communications link to a remote computer or other data storage device. However, a device or method for incorporating such an embodiment should be understood to fall within the scope of the present invention as determined based upon the claims below and any equivalents thereof.

INDUSTRIAL APPLICABILITY

Heavy machinery, heavy equipment, work machines 100, and other machinery like track type loaders 102, have a work implement like a bucket 106 having a linkage 114 and are often used to dig, rack lift, carry, and dump a load. To accomplish this, it is important that the operator not attempt to work with too heavy of a load for the work machine 100 during the work cycles. Often, electronic control is used to assist with controlling the bucket 106 to provide the desired work functions and to control various other components of the work machine 100.

If not properly operated, the bucket 106 of a track type loader 102 can be used to work on too great of a load. For example, lifting a bucket 106 when too heavy of a load is within the bucket 106 or digging with bucket 106 into a hard or solid object. When this occurs, the stress on the implement 106 and frame 108 can be subject to great stress. If the operator continues to improperly subject the implement 106 and the frame 108 to excessive stress, then damage may occur to the work machine 100, particularly on cross members 200 of the frame 108 proximate to the weldjoints 202. Preferably, the stress on components of the frame 108 and implement 106 is measured and compared to a threshold value. Once the stress is equal to or greater than the threshold value, then the operator is warned of the excessive stress on the work machine, thereby giving the operator and opportunity to change the operation of the work machine or reduce the load in order to relieve the stress on the work machine 100. Doing that, the operator may significantly increase the overall life of the structure of the work machine 100.

Further, it is advantageous to record each time the stress signal exceeds the stress limit value in order to understand the typical work cycle of the particular work machine 100, and improve servicing, maintenance, and troubleshooting functions. This can also help identify the cause of increased service or repairs or can help justify the need for optimal components or increased intervals of service and maintenance to the work machine 100.

The apparatus and method of certain embodiments of the present invention, when compared with other methods and apparatus, may have the advantages of recording the highest stress corresponding to abnormal usage; signaling all the overloads directly to the operator; helping the operator reduce the wear and damage to structural members; and being more economical to manufacture and use. Such advantages are particularly worthy of incorporating into the design, manufacture, and operation of work machines 100. In addition, the present invention may provide other advantages that have not been discovered yet.

It should be understood that while the preferred embodiment is described in connection with a track type loader 102 having a bucket 106, the present invention is readily adaptable to provide similar functions on other work machines 100. Other aspects, objects, and advantages of the present invention can be obtained from a study of the drawings, the disclosure, and the appended claims.

What is claimed is:

1. A work machine controlled by an operator and acting upon a load through a plurality of work cycles, comprising:
    a frame;
    a plurality of ground engaging devices supporting the frame;
    an operator compartment supported by the ground engaging devices;
    an implement having a linkage for connecting the implement to the frame;
    an engine coupled to the ground engaging devices; and
    a stress measurement control system, including:
        a strain gauge sensor assembly mounted to at least one of the frame and implement and providing a stress signal having a stress signal value indicative of a stress acting upon at least one of the frame and implement;
        a memory storing at least one stress signal value and at least one pre-determined stress limit value;
        an electronic controller associated with the memory and receiving the at least one stress signal and the at least one pre-determined stress limit value, determining whether the stress signal value is greater than the pre-determined stress limit value and responsively providing an associated message; and
        an operator interface receiving the associated message and providing the associated message to the operator in the operator compartment.

2. The work machine of claim 1, wherein the associated message is provided to the operator as an audible message.

3. The work machine of claim 1, wherein the associated message is provided to the operator as a visual message.

4. The work machine of claim 3, wherein the visual message is a warning light.

5. The work machine of claim 1, wherein the frame includes a cross member and the strain gauge assembly is tack welded to the cross member of the frame.

6. The work machine of claim 1, wherein the frame has a weldjoint and the strain gauge assembly is tack welded proximate the weldjoint.

7. A method of measuring a stress on a work machine controlled by an operator and acting upon a load through a plurality of work cycles, comprising the steps of:
    mounting a strain gauge sensor assembly to at least one of a frame and implement;
    providing a stress signal having a stress signal value indicative of a stress acting upon at least one of the frame and implement;
    storing at least one stress signal value and at least one pre-determined stress limit value;
    receiving the at least one stress signal and the at least one pre-determined stress limit value;
    determining whether the stress signal value is greater than the pre-determined stress limit value and responsively providing an associated message; and
    receiving the associated message and providing the associated message to the operator in the operator compartment.

8. The method of claim 7, including the step of providing the associated message to the operator as an audible message.

9. The method of claim 7, including the step of providing the associated message to the operator as a visual message.

10. The method of claim 7, including the step of tack welding the strain gauge assembly to a cross member of the frame.

11. The method of claim 10, including the step of tack welding the strain gauge assembly proximate the weldjoint.

12. A work machine controlled by an operator and acting upon a load through a plurality of work cycles, comprising:
    a frame having at least one cross member subject to stress that changes depending on a work cycle and load, the cross member being connected to the frame by a weldjoint;

an implement engaging the load and having a linkage for connecting the implement to the frame;

a plurality of ground engaging devices supporting the frame;

an operator compartment supported by the ground engaging devices;

an engine coupled to the ground engaging devices; and a stress measurement control system, including:

a strain gauge sensor assembly tack welded to the cross member proximate the weldjoint and providing a stress signal having a stress signal value indicative of the stress acting upon the frame;

a memory storing at least one stress signal value and at least one pre-determined stress limit value;

a controller associated with the memory and receiving the at least one stress signal and the at least one pre-determined stress limit value, determining whether the stress signal value is greater than the pre-determined stress limit value and responsively providing an associated message; and an operator interface receiving the associated message and providing the associated message to the operator in the operator compartment.

\* \* \* \* \*